United States Patent

Seki

Patent Number: 5,254,831
Date of Patent: Oct. 19, 1993

[54] METHOD OF MANUFACTURING BOBBINS FOR SEWING MACHINE

[76] Inventor: Masahiro Seki, 735 Ouazanakanokuchi, Nakanokuchimura, Nishikanbaragun, Niigataken, Japan

[21] Appl. No.: 998,344
[22] Filed: Dec. 30, 1992
[51] Int. Cl.⁵ .............................................. B23K 26/00
[52] U.S. Cl. ................................................ 219/121.64
[58] Field of Search ...................... 219/121.63, 121.64, 219/121.13, 121.14

[56] References Cited

U.S. PATENT DOCUMENTS 3,719,332  3/1973  McLain ............................. 242/125.1
4,163,314  8/1979  Sauer ...................................... 29/593
4,760,237  7/1988  Mizukado et al. ............. 219/121.82

FOREIGN PATENT DOCUMENTS 48-9610  8/1973  Japan.

Primary Examiner—C. L. Albritton
Attorney, Agent, or Firm—Quarles & Brady

[57] ABSTRACT

Method of manufacturing a sewing machine bobbin having flanges at both ends, which is characterized by integrally welding bobbin parts by means of laser beam irradiation. Aluminum is suitable for bobbin material except having comparatively low melting point, which has conventionally made it difficult to use aluminum material for bobbin. Described is the method of welding alminum bobbin parts by means of laser beam irradiation, which is also available for welding other materials.

6 Claims, 2 Drawing Sheets

METHOD OF MANUFACTURING BOBBINS FOR SEWING MACHINE

BACKGROUND OF THE INVENTION (a) Field of the Invention

The present invention relates to the method of manufacturing bobbins applied to sewing machines.

(b) Description of Prior Art

In prior methods of manufacturing bobbins for sewing machines, there have heretofore been two generally categorized methods, such as method of cutting the whole bobbin body and method of welding flanges to bobbin shaft. In said cut work method, as shown in Japanese Patent Publication NO.48-9610, bobbins are machined out from metallic pole. And in said welding work method, flanges formed by press working etc. are welded or caulked to bobbin shaft which is machined out in advance.

And the method of utilizing laser beam machines for machining a large number of workpieces is disclosed, as shown in U.S. Pat. No. 4,760,237, which comprises stationary guide means, a first table movably mounted on the stationary guide means for moving between two positions, a movable guide means liftably disposed, and a second table movably mounted on the movable guide means for movement between the two positions. However, nothing is disclosed therein about the solution to the problem inherent to welding bobbin material. Steel bobbin in general needs to be plated on the surface because of its poor corrosion resistance. On the contrary, aluminum bobbin, for example, is comparatively light and surpasses steel bobbin in corrosion resistance. There have heretofore been, however, such problems that the method of cutting alminum bobbin requires many processes therein, in addition to such exteremely low yield that the weight of finished product is only about one tenth of that of original material. On the other hand, the above-mentioned methods of welding work have had their own problems. That is, bobbins have low intensity if manufactured by means of the caulk method and even have holes or deformations in the welded portion if manufactured by means of the electric welding, which is mainly caused by comparatively low melting point of aluminum and has prevented the electric welding method from being embodied.

One solution for overcoming these problems, for example, is to utilize laser beam as welding means. Nevertheless, conventional laser beam machines have not been applied to welding alminum material, as already shown in U.S. Pat. No. 4,760,237, which discloses nothing about the method of welding alminum material by means of laser beam.

SUMMARY OF THE INVENTION

It is, therefore, an object of the present invention to provide a method of manufacturing alminum bobbins for sewing machines.

It is another object of the present invention to provide a method of manufacturing alminum bobbins which have high intensity and still be easily manufactured.

In order to achieve the above-mentioned objects, there are essentially provided a laser beam projecting device, aluminum bobbin shaft and aluminum flanges manufactured in advance. At both ends of aluminum bobbin shaft are provided stepped portions, and in the centers of said flanges is punched one hole respectively, into which the stepped portions are to be fitted respectively. After aluminum bobbin parts are assembled in the above-described manner, on the fitted areas of said bobbin shaft and flanges are projected laser beam.

According to the present invention, bobbin shaft and flanges are successfully welded and secured without deformations and holes, and bobbins with strong intensity can be easily obtained.

BRIEF DESCRIPTION OF THE DRAWINGS

These and other objects of the invention will be seen with reference to the description, taken in connection with the accompanying drawings, in which.

DESCRIPTION OF THE PREFERRED EMBODIMENT

Hereinafter is described the preferred embodiment of the present invention with reference to the drawings.

Figure 1:
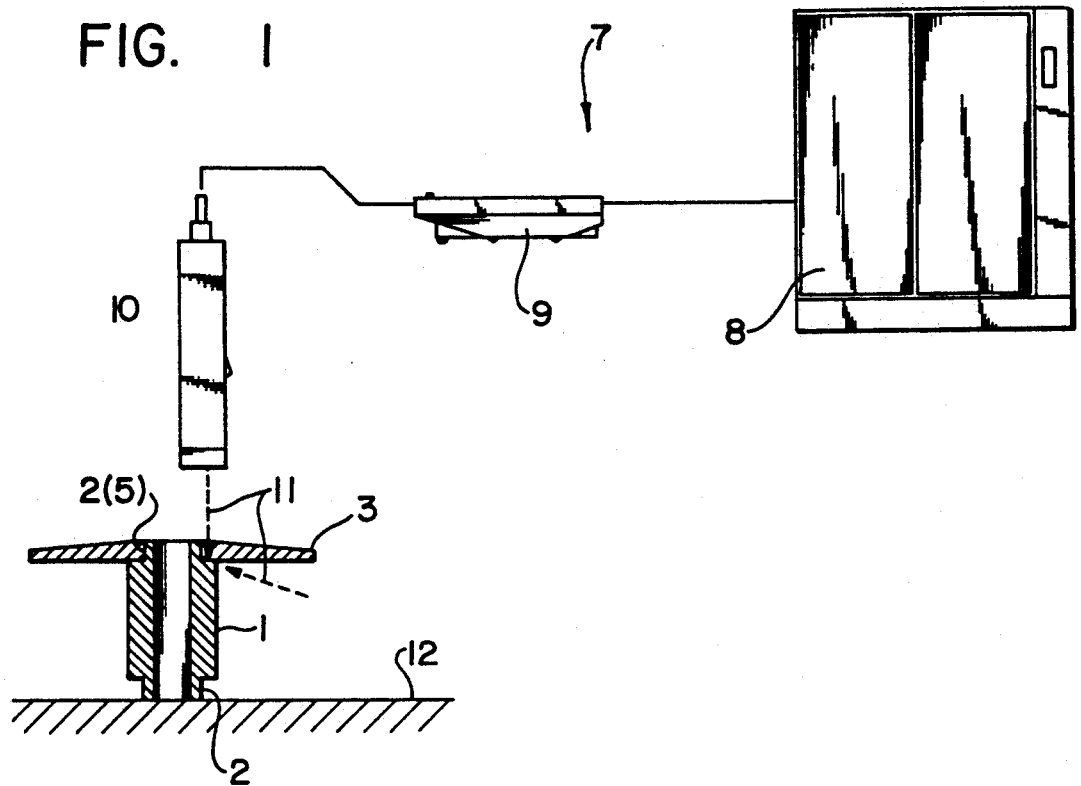
FIG. 1 is sectional view showing the first process.
Figure 2:
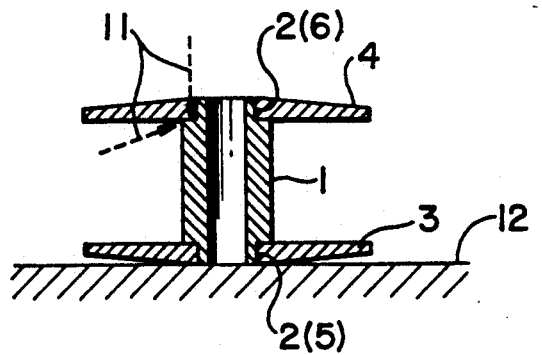
FIG. 2 is sectional view showing the second process.

FIGS. 1,2 show the first embodiment, wherein aluminum bobbin shaft 1 obtained by machining an aluminum pipe to the predetermined length has approximately 8 mm outside diameter, 6 mm inside diameter and 9 mm longitudinal length. At the both longitudinal ends of the outer peripheral surface are formed stepped portions 2 fitting into center holes 5, 6 of aluminum flanges 3,4 obtained by punching a thin aluminum plate. These flanges 3,4 are formed with approximately 21 mm outside diameter and 1 mm thickness. Laser beam machine device 7 for welding flanges 3, 4 to said bobbin shaft 1 is composed of power supply 8, laser beam transmitting device 9 integrating yttrium-aluminum-garnet laser (yag laser)(not shown), laser beam projecting device 10 of handy type etc. The numeral 12 shows a workbench.

Accordingly, after having fitted stepped portion 2 of bobbin shaft 1 into a hole 5 of one flange 3, said laser beam projecting device 10 is headed from outside or inside of said fitted area to the periphery of hole 5 to irradiate there with laser beam 11 having wavelength less than 5 $\mu$m, averagely energized within 400 W, preferably within 250 W, so that all-round or spaced peripheral areas of said hole 5 can be welded to the bobbin shaft by operating laser beam projecting device 10 along the periphery of hole 5. Likewise, the other flange 4 can be welded to bobbin shaft 1.

As described above, after stepped portion 2 formed at the ends of aluminum bobbin shaft I are fitted into holes 5,6 of aluminum flanges 3,4, and appropriately aligned, said fitted area can be irradiated with laser beam 11 having wavelength less than 5 $\mu$m. Such method of utilizing laser beam 11 only requires comparatively small energy in welding process and makes it possible to manufacture aluminum bobbins for sewing machines without forming useless holes and deformations therein. Additionally, wavelength of laser beam 11 is provided within 5 $\mu$m in order to prevent too strong energy of the laser beam from forming said useless holes and deformations. Further, said laser beam projecting device 10 can project laser beam 11 on said fitted area without contacting said flanges 3,4, so that said flanges 3,4 are not affected by external force. Consequently, said flanges 3,4 are more precisely welded as compared with electric resistance welding means.

Furthermore, said yag laser also allows laser beam 11 to be controlled within comparatively small energy, which is necessary in welding aluminum material without making useless holes and deformations.

Figure 3:
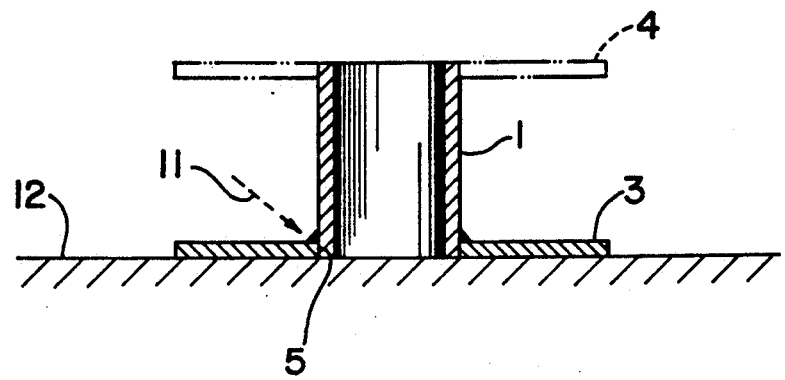
FIG. 3 is sectional view showing the second embodiment.
Figure 4:
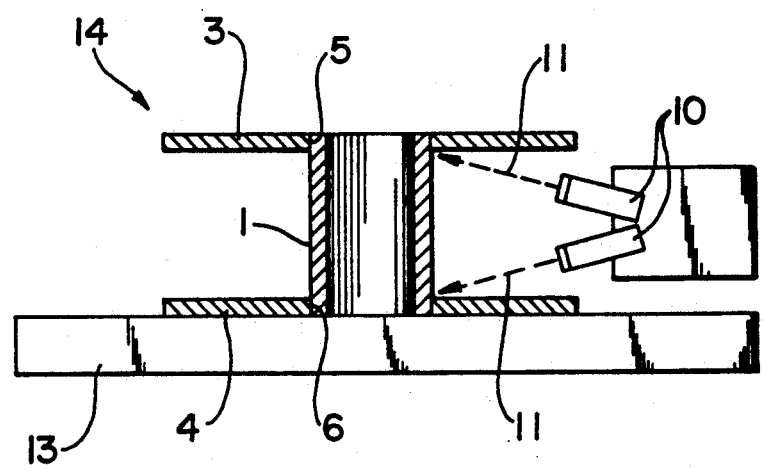
FIG. 4 is sectional view showing the third embodiment.

Hereinafter, the second embodiment of the present invention is described, wherein the detailed description about the same parts as those of the first embodiment will be omitted with reference to the same numerals as those of the first embodiment. The second embodiment is shown in FIGS. 3,4. On workbench 12 is placed in advance one flange 3, into the hole 5 of which are vertically fitted bobbin shaft 1. Thereafter, the fitted area is irradiated with laser beam 11 having wavelengh less than 5 μm to weld said fitted area. Likewise, the other flange is also capable of being welded to bobbin shaft 1 in the same manner.

As described above, welding method utilizing laser beam 11 having less than 5 μm wavelength permits the welding to be successfully effected without making deformations and the like because laser beam 11 is controlled in comparatively small energetic level described above. Consequently, the present invention allows flanges to be welded to bobbin shaft without deformations in addition to at low cost. This invention should not be limited to these embodiments described above, and can be varied within the scope of the invention.

For example, said bobbin shaft and flanges may be composed of aluminum alloy, or said laser beam may be so pulsed as to have more than 0.5 ms pulse duration and 0.1 to 55 J, preferably, 0.1 to 35 J. pulse energy. Additionally, although excellent aluminum bobbin can be manufactured when the wavelength of the laser beam is controlled within 5 μm, the wavelength less than 7.5 μm can be available for the present invention in accordance with the thickness of aluminum material. Furthermore, instead of laser projecting device of handy type shown in said embodiments, special purpose machine may be available, wherein a fixture such as chuck device (not shown) is provided on a rotary table 13, and laser projecting device 10 faces bobbin 14 placed on said rotary table 13 to irradiate peripheries of holes 5,6, as shown in FIG. 4. In addition to above-described asssembly type or three-piece type, two-piece type, in which each flange being integrally formed with half bobbin shaft, may be provided. In this case, each end of said half bobbin shafts is welded by means of laser beam. Additionally, bobbin material is not limited to only aluminum but may be steel.

What is claimed is:

1. A method of manufacturing a sewing machine bobbin having flanges at both ends, which is characterized by integrally welding bobbin parts by means of laser beam irradiation.

2. A method of manufacturing a sewing machine bobbin according to claim 1, which comprises the steps of; discretely manufacturing a bobbin shaft and flanges, fitting said flanges into the both ends of said bobbin shaft.

3. A method of manufacturing a sewing machine bobbin according to claim 1, which comprises the steps of; manufacturing a pair of parts including part of bobbin shaft and a flange respectively, said part of bobbin shaft and said flange being integrally formed, welding the ends of said parts of bobbin shaft by means of laser beam irradiation.

4. A method of manufacturing a sewing machine bobbin according to claim 1, wherein said sewing machine bobbin is made of alminum.

5. A method of manufacturing a sewing machine bobbin according to claim 1, wherein said sewing machine bobbin is made of steel.

6. A method of manufacturing a sewing machine bobbin according to claim 1, wherein said bobbin parts are irradiated with laser beam with said bobbin parts rotated.

* * * * *